United States Patent [19]

Schulz et al.

[11] Patent Number: 4,873,023
[45] Date of Patent: Oct. 10, 1989

[54] PREPARATION OF MONOOLEFINICALLY UNSATURATED CARBOXYL-CONTAINING VERSATIC ESTERS

[75] Inventors: Guenther Schulz, Bad Duerkheim; Wolfgang Druschke, Dirmstein; Helmut Jaeger, Bobenheim, all of Fed. Rep. of Germany

[73] Assignee: BASF Aktiengesellschaft, Ludwigshafen, Fed. Rep. of Germany

[21] Appl. No.: 273,973

[22] Filed: Nov. 21, 1988

[30] Foreign Application Priority Data

Nov. 21, 1987 [DE] Fed. Rep. of Germany ....... 3739542

[51] Int. Cl.$^4$ ................................................ C11C 1/00
[52] U.S. Cl. .................................. 260/404.8; 528/272; 560/204
[58] Field of Search ...................... 560/204; 260/404.8

[56] References Cited

U.S. PATENT DOCUMENTS 4,174,307  11/1979  Rowe .............................. 204/159.19
4,305,854  12/1981  Rowe ......................... 204/159.16 X

FOREIGN PATENT DOCUMENTS 0088300  9/1983  European Pat. Off. .
0147172  7/1985  European Pat. Off. .

*Primary Examiner*—Werren B. Lone
*Assistant Examiner*—Vera C. Clarke
*Attorney, Agent, or Firm*—Oblon, Spivak, McClelland, Maier & Neustadt

[57] ABSTRACT

Compounds of the general formulae

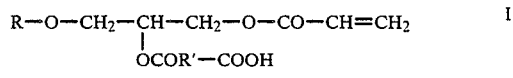

and

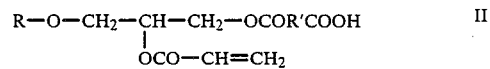

where R is versatyl and R' is unsubstituted or alkyl-substituted straight-chain alkylene of 4 or 5 carbon atoms can be prepared by reacting the versatic ester of 1,3-dihydroxy-propyl-2 acrylate and/or of 2,3-dihydroxy-propyl-1 acrylate with equimolar amounts of saturated or monoolefinically unsaturated cyclic dicarboxylic anhydrides having 4 or 5 carbon atoms and an oxygen atom in the ring at from 50° to 150° C. in the presence of customary esterification catalysts and can be used as reactive diluents in radiation-curable contact adhesives.

3 Claims, No Drawings

PREPARATION OF MONOOLEFINICALLY UNSATURATED CARBOXYL-CONTAINING VERSATIC ESTERS

Monoversatic esters of 1,3-dihydroxy-propyl-2-acrylate and of 2,3-dihydroxy-propyl-1 acrylate and mixtures thereof are known. They can be prepared in a conventional manner by esterifying the dihydroxypropyl acrylate with an equimolar amount of versatic acid in the presence of a customary esterification catalyst. Such hydroxyl-containing monoolefinically unsaturated versatic esters have previously been used for the preparation of radiation-curable self-adhesive coatings in the process of European Pat. No. 0,088,300, giving adhesive bonds having particularly good peel and shear strengths.

We have found that compounds of the general formulae

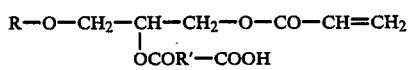

and

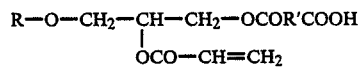

where R is versatyl and R' is unsubstituted or alkylsubstituted straight-chain alkylene of 4 or 5 carbon atoms, are preparable by reacting versatic esters of 1,3-dihydroxy-propyl-2 acrylate or of 2,3-dihydroxy-propyl-1 acrylate with equimolar amounts of saturated or monoolefinically unsaturated cyclic dicarboxylic anhydrides having 4 or 5 carbon atoms and an oxygen atom in the ring at from 50° to 150° C. in the presence of customary esterification catalysts. In the novel process, it is also possible, with advantage, to use mixtures of the versatic esters of 1,3-dihydroxy-propyl-2 acrylate and 2,3-dihydroxy-propyl-1 acrylate. Possible cyclic dicarboxylic anhydrides are those of saturated or of monoolefinically unsaturated dicarboxylic acids, for example maleic anhydride, succinic anhydride or monoalkyl- or dialkyl-substituted maleic or succinic anhydride.

In the reaction, the reactants are reacted in equimolar amounts, preferably at from 70° to 95° C., in the presence of customary esterification catalysts. Examples of such esterification catalysts are in particular p-dimethylaminopyridine, N-methylimidazole, N-methylmorpholine and p-pyrrolidinopyridine.

Such esterification catalysts are used in customary amounts, such as usually from 0.1 to 5, in particular from 0.5 to 2, % by weight, based on the total weight of the reactants. The reaction according to the invention is in general carried out without the addition of solvents, but it is also possible to use solvents of the ethyl acetate, butyl acetate, acetone or toluene type in amounts of usually from 50 to 200% by weight, based on the total weight of the reactants. If such solvents are used, they can be easily evaporated off after the reaction has taken place, if necessary under reduced pressure.

The compounds of the general formulae I and II are novel. They can be used with particular advantage as reactive diluents in radiation-curable contact adhesives, their amount frequently being from 10 to 80, in particular from 20 to 70, % by weight, based on the total weight of the radiation-curable contact adhesive. Such radiation-curable contact adhesives or mixtures for preparing contact adhesives contain as further components at least one reactive oligomeric polyester (meth)acrylate and/or polyurethane (meth)acrylate and/or polymers having a glass transition temperature below 0° C. and a K value of from 20 to 80. Oligomeric polyester (meth)acrylates usually have molecular weights of from 200 to 50,000, preferably of from 500 to 20,000.

Suitable polyurethane (meth)acrylates have for example molecular weights of from 500 to 100,000 and may be prepared by reacting (a) diisocyanates with (b) from 20 to 99 equivalent %, based on (a), of polyesterols and/or polyetherols, (c) from 0 to 60 equivalent %, based on (a) of diols of from 2 to 50 carbon atoms, (d) alkyl hydroxyallyl(meth)acrylates of from 2 to 20 carbon atoms in the alkyl moieties and (e) monohydroxyalkylcarboxylic acids and with from 2 to 90% by weight, based on the total amount of the reactants, of monovinyl compounds, the total of the amounts of components (b) to (e) being equivalent to the amount of component (a) in terms of OH groups, the amount of components (d) and (e) together being from 1 to 50 equivalent %, based on component (a), and the equivalent ratio of component (d) to component (e) being from 1:9 to 9:1.

Suitable polymers having a glass transition temperature below 0° C. can be prepared in a conventional manner using free radical initiators in emulsion, suspension, in the melt or preferably in solution by polymerization. Suitable polymers are for example polymers or copolymers of monoolefinically unsaturated carboxylic esters such as straight-chain or branched esters of acrylic and methacrylic acid containing from 1 to 12 carbon atoms in the alkyl moieties, such as methyl, ethyl, propyl, butyl, pentyl, hexyl, 2-ethylhexyl, octyl, decyl and dodecyl acrylate and methacrylate, and also of vinyl esters such as vinyl acetate, vinyl propionate, vinyl ethylhexanoate, vinyl versatate and vinyl laurate. Besides carboxylic esters, such polymers may also contain other olefinically unsaturated monomers, for example monocarboxylic or dicarboxylic acids usually of from 3 to 5 carbon atoms, such as acrylic acid, methacrylic acid, maleic, fumaric, itaconic or crotonic acid, and also acid or neutral alkyl esters of unsaturated di-car-boxylic acids, in copolymerized form. Further comonomers are for example styrene, acrylonitrile, methacrylonitrile and also vinyl halides, such as vinyl chloride and vinylidene chloride 1,3-dienes such as butadiene and alkyl esters of $\alpha,\beta$-monoolefinically unsaturated dicarboxylic acids, such as diethyl maleate and dibutyl maleate.

Furthermore, such radiation-curable mixtures may contain customary resin tackifiers in amounts of from 0 to 60, preferably of from 5 to 40, % by weight, based on the radiation-curable contact adhesives. Examples thereof are terpene resins, balsam resins, colophony resins, colophony, hydrogenated colophony, esters of colophony or hydrogenated colophony, such as the glycerol ester, the pentyl ester, the ethylene glycol ester, the diethylene glycol ester, methyl ester or the propyl esters of (hydrogenated) colophony.

In addition, such mixtures may contain thermal stabilizers in customary amounts, for example 2,6-di-tert-butyl-p-cresol, hydroquinone, hydroquinone methyl ether or phenothiazine.

Finally, such mixtures generally contain photoinitiators of the benzil dimethyl ketal type.

Further examples of suitable photoinitiators are acyl phosphine oxides and benzoin ethers.

In the Examples below, parts and percentages are by weight, unless otherwise stated. The K values reported therein have been determined in accordance with German Standard Specification DIN 53,726.

EXAMPLE 19.5 parts of a versatic monoester mixture of 2,3-dihydroxy-propyl-1 acrylate and 1,3-dihydroxy-propyl-2 acrylate are mixed with 0.2 parts of N-methylimidazole and 5 parts of succinic anhydride, and the mixture is stirred at 90° C. for 5 hours. The reaction product obtained is a mixture of the corresponding succinic monoesters having an acid number of 131 mg/g and a viscosity of 6.5 Pas at 23° C.

To test the product of the working example for suitability as a reactive diluent for radiation-curable contact adhesives, various mixtures are prepared and subjected to a peel test to determine their adhesive properties. In this peel test, polyester films are coated with the mixtures in such a way that the coating has a thickness of 25 μm (corresponding to an add-on of 25 g per m²). The coating applied to the base is irradiated with electron beams in an electrocurtain apparatus. The coated and irradiated films are used in the form of 2 cm wide test strips. To test the peel strength, the test strips are then adhesively bonded to a chromed plate and peeled off in a direction parallel to the adhesive layer, ie. at an angle of 180°, the force required being measured. The peel-off speed is 300 mm/min, and the measurement is carried out 24 hours after the adhesive bond is formed.

Contact adhesive mixture (a)

200 parts of a 50% strength solution of a polyurethane acrylate of K value 37.4 in ethyl acetate are mixed with 100 parts of the product of the Example, and the peel strength of a contact adhesive application prepared therefrom as described above is determined and listed in the Table.

The polyurethane acrylate is prepared as follows:

73.2 parts of isophorone diisocyanate are added at 60° C. to a solution of 400 parts of a polyesterol having an average molecular weight of 2,000 g/mol composed of adipic acid and butanediol, pentanediol and hexanediol, 6.8 parts of butandiol and 96 parts of butandiol monoacrylate and also 0.1 part of hydroquinone in 500 parts of ethyl acetate and stirred at that temperature for 10 hours.

Contact adhesive mixture (b)

100 parts of a polyurethane acrylate of K value 45.9 are mixed with 100 parts of the product of the Example, and the peel strength of a contact adhesive application prepared from that mixture as described above is determined and given in the table.

The polyurethane acrylate is prepared as described in (a), except that 14 parts of hexanediol, 4.8 parts of butanediol monoacrylate and 79.3 parts of isophorone diisocyanate are used to 400 parts of the polyesterol described there.

Contact adhesive (c)

50 parts of a copolymer prepared in a conventional manner from 60 parts of 2-ethylhexyl acrylate, 38 parts of vinyl acetate and 2 parts of acrylic acid by solution polymerization and having a K value of 60 and a glass transition temperature of −30° C. are mixed with 50 parts of the product of the Example. The peel strength of a contact adhesive application prepared from the mixture as described above is determined and reported in the Table.

COMPARATIVES (a') The procedure followed is as described in the case of contact adhesive mixture (a), except that the 100 parts of the reactive diluent obtained in the Example are replaced by 100 parts of the versatic monoester mixture of 2,3-dihydroxy-propyl-1 acrylate and 1,3-dihydroxy-propyl-2 acrylate. The peel strength obtained with the resulting mixture is given in the Table.

(b') The procedure used for (b) is repeated, except that the 100 parts of the reactive diluent of the Example are replaced by 100 parts of the versatic monoester mixture of 2,3-dihydroxy-propyl-1 acrylate and 1,3-dihydroxy-propyl-2 acrylate. The peel strength obtained therewith is given in the Table.

(c') The procedure used under (c) is repeated, except that the 50 parts of reactive diluent of the Example are replaced by 50 parts of the versatic monoester mixture of 2,3-dihydroxy-propyl-1 acrylate and 1,3-dihydroxy-propyl-2 acrylate. The peel strength obtained therewith is given in the Table.

TABLE

| Contact adhesive | Peel strength (after 24 hours in N/cm) |
| --- | --- |
| a | 4.7 |
| b | 5.8 |
| c | 5.1 |
| a' | 1.8 |
| b' | 2.9 |
| c' | 2.3 |

We claim:

1. A process for preparing a compound of the general formula

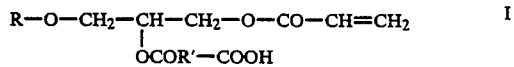

or

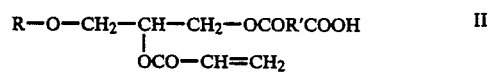

where R is versatyl and R' is unsubstituted or alkyl-substituted straight-chain alkylene of 4 or 5 carbon atoms, which comprises reacting the versatic ester of 1,3-dihydroxy-propyl-2 acrylate or of 2,3-dihydroxy-propyl-1 acrylate with an equimolar amount of a saturated or monoolefinically unsaturated cyclic dicarboxylic anhydride having 4 or 5 carbon atoms and an oxygen atom in the ring at from 50° to 150° C. in the presence of an esterification catalyst.

2. A process as claimed in claim 1, wherein a mixture of the versatic esters of 1,3-dihydroxy-propyl-2 acrylate and 2,3-dihydroxy-propyl-1 acrylate is used in the esterification reaction.

3. A process as claimed in claim 1, wherein the esterification catalyst is selected from the group consisting of p-dimethylaminopyridine, N-methylimidazole, N-methylmorpholine and p-pyrrolidinopyridine.

* * * * *